US012708575B2

(12) United States Patent
Dufek

(10) Patent No.: US 12,708,575 B2
(45) Date of Patent: Aug. 18, 2026

(54) RESTRAINT ANCHOR FOR PATIENT SUPPORT APPARATUSES

(71) Applicant: Daves Medical LLC, Port Orange, FL (US)

(72) Inventor: David A. Dufek, Daytona Beach, FL (US)

(73) Assignee: Daves Medical LLC, Port Orange, FL (US)

( * ) Notice: Subject to any disclaimer, the term of this patent is extended or adjusted under 35 U.S.C. 154(b) by 0 days.

(21) Appl. No.: 19/008,158

(22) Filed: Jan. 2, 2025

(65) Prior Publication Data

US 2025/0367049 A1 Dec. 4, 2025

Related U.S. Application Data

(60) Provisional application No. 63/653,033, filed on May 29, 2024.

(51) Int. Cl.
*A61G 7/05* (2006.01)

(52) U.S. Cl.
CPC .................................. *A61G 7/0504* (2013.01)

(58) Field of Classification Search
CPC Y10T 24/3987; A61G 7/0507; A61G 7/0504; A61F 5/3761; B60P 7/0823; B65D 63/1018
USPC ....... 128/882, 878, 133, 134, 157, 165, 166, 128/171, DIG. 15; 24/72, 2, 319, 321; 54/68; 119/96
See application file for complete search history.

(56) References Cited

U.S. PATENT DOCUMENTS

| | | | | | |
|---|---|---|---|---|---|
| 1,596,792 | A * | 8/1926 | Barry | A61F 5/3761 | 128/878 |
| 2,706,477 | A * | 4/1955 | Daake | A61F 5/3761 | 128/878 |
| 3,536,068 | A * | 10/1970 | Stubbs | A61F 5/3761 | 128/878 |
| 4,422,455 | A * | 12/1983 | Olsen | A61F 5/3761 | 128/882 |
| 4,765,279 | A * | 8/1988 | Klickstein | A01K 27/003 | D29/100 |
| 5,351,654 | A * | 10/1994 | Fuentes | A01K 27/00 | D30/153 |
| 5,363,810 | A * | 11/1994 | Kraus | A01K 27/003 | 119/795 |

(Continued)

*Primary Examiner* — J. T. Newton
(74) *Attorney, Agent, or Firm* — Gardner, Linn, Burkhart & Ondersma LLP

(57) ABSTRACT

A restraint anchor for a component of a patient support apparatus includes a strap having first and second strap sections. The first strap section has opposed first and second distal ends and forms a loop between the first and second distal ends, with the first strap section for looping around the component of the patient support apparatus and for receiving the second strap section through the loop for securing the anchor to the component. The second strap section has first and second ends, with the first end of the second strap section coupled to the first and second distal ends of the first strap section, and the second end of the second strap section coupled to a buckle component. The strap further has at least one stop to limit movement of the second strap section through the loop wherein the stop helps retain the anchor on the component.

19 Claims, 5 Drawing Sheets

(56) References Cited

U.S. PATENT DOCUMENTS

| | | | | | |
|---|---|---|---|---|---|
| 5,806,467 | A * | 9/1998 | Arakawa | A01K 27/003 | 119/797 |
| 6,168,556 | B1 * | 1/2001 | Saavedra | A63B 21/4021 | 224/267 |
| 6,418,594 | B1 * | 7/2002 | Miller | B60N 3/023 | 24/298 |
| 6,971,334 | B1 * | 12/2005 | Livesay | A01K 27/003 | 119/797 |
| 7,096,827 | B2 * | 8/2006 | Sporn | A01K 27/005 | 119/793 |
| 7,188,585 | B1 * | 3/2007 | Carter | A01K 27/005 | 119/798 |
| 11,471,317 | B1 * | 10/2022 | Spears | A61G 7/0507 | |

* cited by examiner

RESTRAINT ANCHOR FOR PATIENT SUPPORT APPARATUSES

CROSS REFERENCE TO RELATED APPLICATION

The present application claims the priority benefit of U.S. provisional patent application Ser. No. 63/653,033, filed on May 29, 2024, which is incorporated herein by reference in its entirety.

TECHNICAL FIELD AND BACKGROUND

The present disclosure relates to restraints for patients, and more specifically to a restraint anchor that can be secured to a component of a patient support apparatus, such as a hospital bed.

SUMMARY

A restraint anchor for anchoring restraint to a patient support apparatus includes a strap having a first strap section and a second strap section. The first strap section has opposed first and second distal ends and forms a loop between the first and second distal ends for looping around a component of the patient support apparatus and for receiving the second strap section through the loop for securing the restraint anchor to the component. The second strap section has first and second ends, with the first end of the second strap section coupled to the first and second distal ends of the first strap section, and the second end of the second strap section coupled to a buckle component, such as a buckle body or a buckle tab. The strap has at least one stop to limit backwards movement of the second strap section through the loop wherein the stop helps retain the restraint anchor on the component.

In one embodiment, the stop comprises a second loop having a base and a looped end, with the base being secured to or formed at the strap. Optionally, the restraint anchor includes a pair of the stops. For example, the pair of stops may be secured to opposed sides of the strap.

In another aspect, the first strap section comprises a section of strap that is folded over along its longitudinal length so that its width is reduced and optionally approximately half of the width of the section of strap to facilitate insertion.

In another aspect, the second strap section is stitched to the first and second distal ends of the first strap section.

In yet another aspect, the second strap section forms the stop. For example, the second strap section may be looped to form the stop. In another example, the first end of the second strap section is looped to form the stop.

According to yet another aspect, the second end of the second strap section is looped through the buckle body or buckle tab to couple the buckle body or buckle tab to the strap via the second end.

DETAILED DESCRIPTION OF THE DRAWINGS

Figure 8:
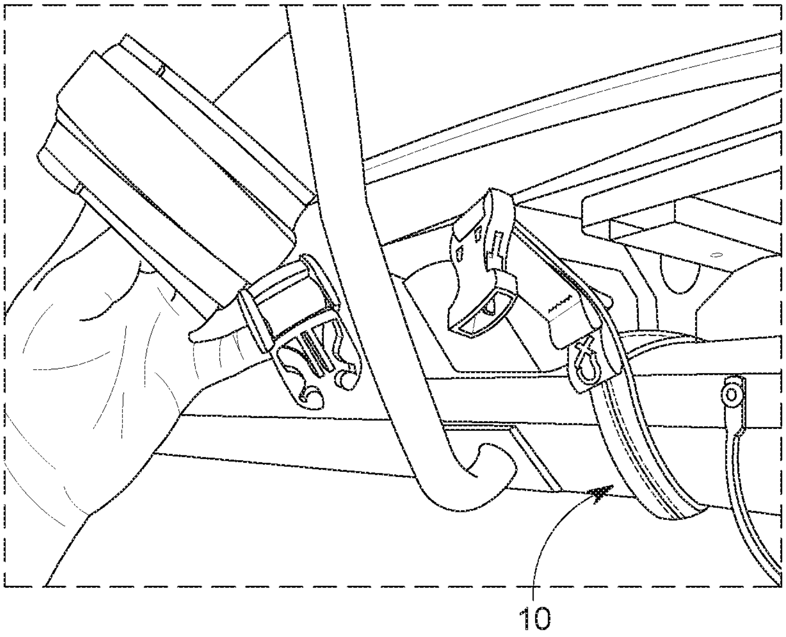
Figure 9:
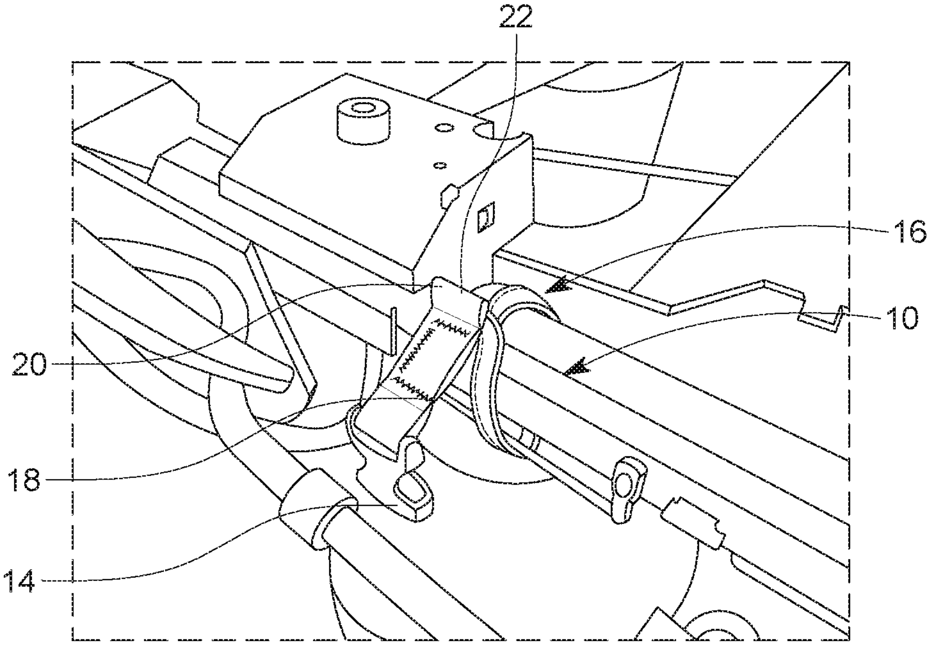

FIG. 8 is a bottom perspective view illustrating the securement of the second strap section in the loop formed by the first strap section and a restraint strap with a buckle tab ready for coupling to the buckle body on the restraint anchor; and FIG. 9 illustrates the restraint anchor being secured to the patent support apparatus with the buckle body ready for connecting to a buckle tab on a restraint strap.

DETAILED DESCRIPTION

Figure 1:
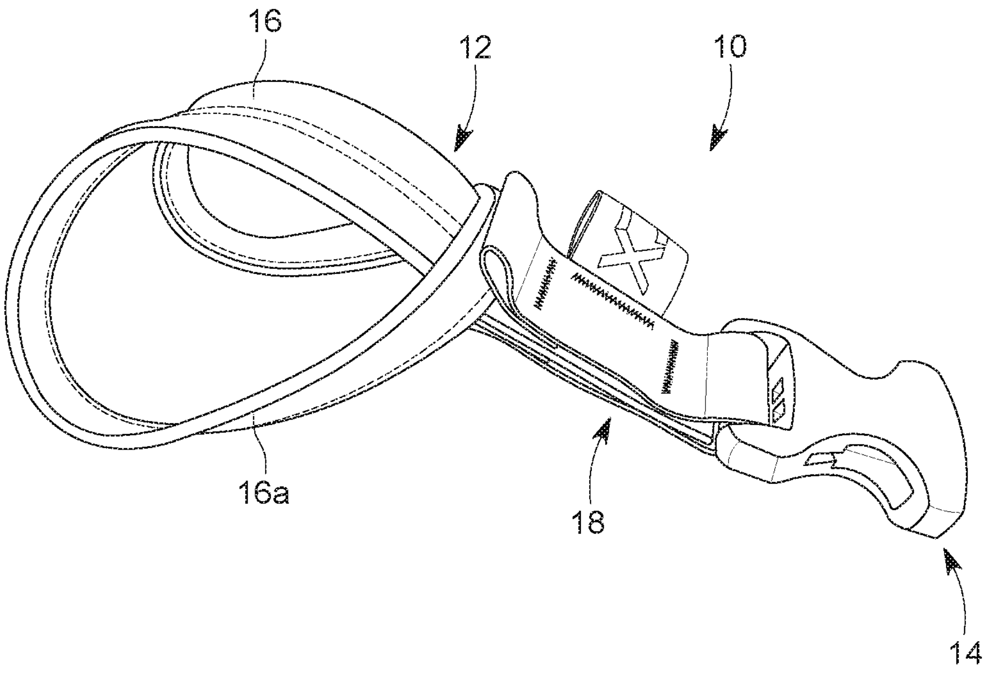
FIG. 1 is an enlarged perspective view of a restraint anchor with a strap having a first strap section forming a loop and a second strap section for extending through the loop to secure the restraint anchor to a patient support apparatus.

Referring to FIG. 1, the numeral 10 designates a restraint anchor. As will be more fully described below, restraint anchor 10 is configured to allow a user to quickly and easily secure restraint anchor 10 to a patient support apparatus, such as a hospital bed, and also quickly remove it for relocating it somewhere else on the patient support apparatus or for cleaning.

As best seen in FIG. 1, restraint anchor 10 includes a strap 12 and a buckle component 14, such as a buckle body or buckle tab. For illustration, strap 12 is shown with a buckle component 14 in the form of a buckle body secured to the strap, but a buckle tab may be alternately mounted to the strap.

Figure 2:
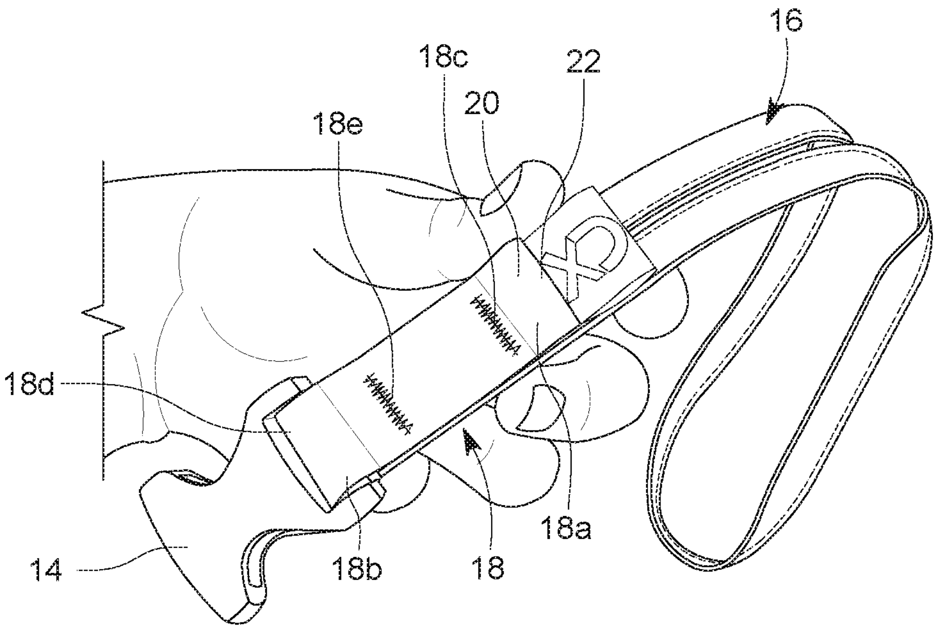
FIG. 2 is another enlarged perspective view of the restraint anchor showing one side of the second strap section, which can be a mirror image of the other side of the second strap section.

As best seen in FIG. 2, strap 12 includes a first strap section 16 and a second strap section 18. Strap section 16 forms a loop **16*a* (FIG. 1) for securing the restraint anchor 10 to a component of the patient support apparatus, with second strap second 18 for looping through the loop 16*a* formed by first strap section 16 when first strap section 16 is looped around the component of the patient support apparatus to thereby secure the restraint anchor 10** to the patient support apparatus.

Figure 3:
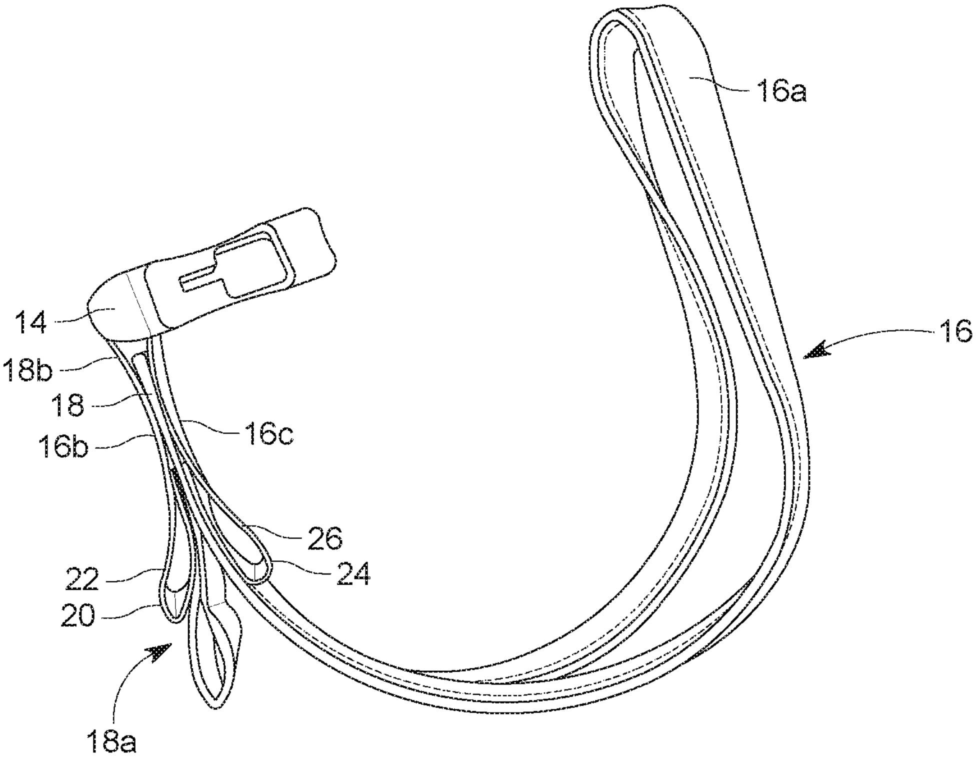
FIG. 3 is a side view of the restraint anchor illustrating two stops at opposed sides of the strap.
Figure 4:
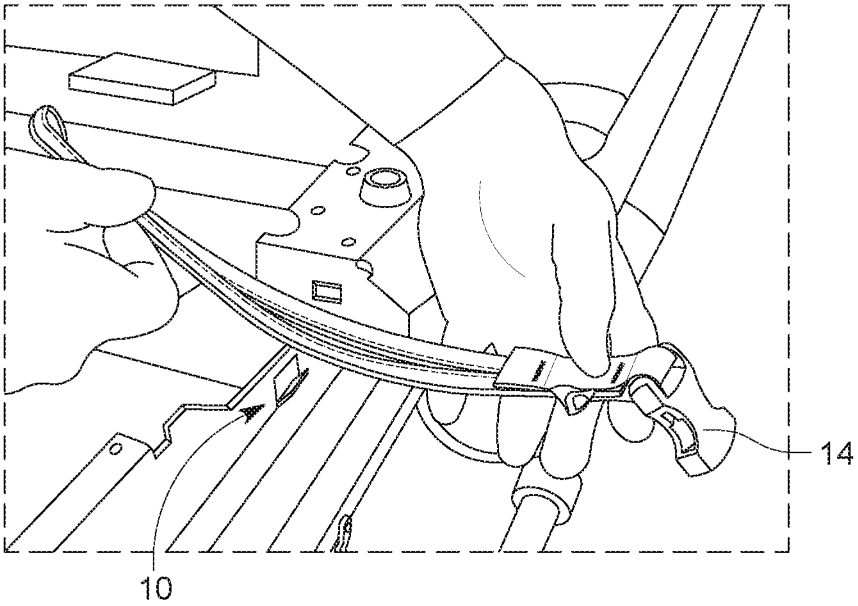
FIG. 4 is side view of the restraint anchor extended before being applied to the patent support apparatus.
Figure 5:
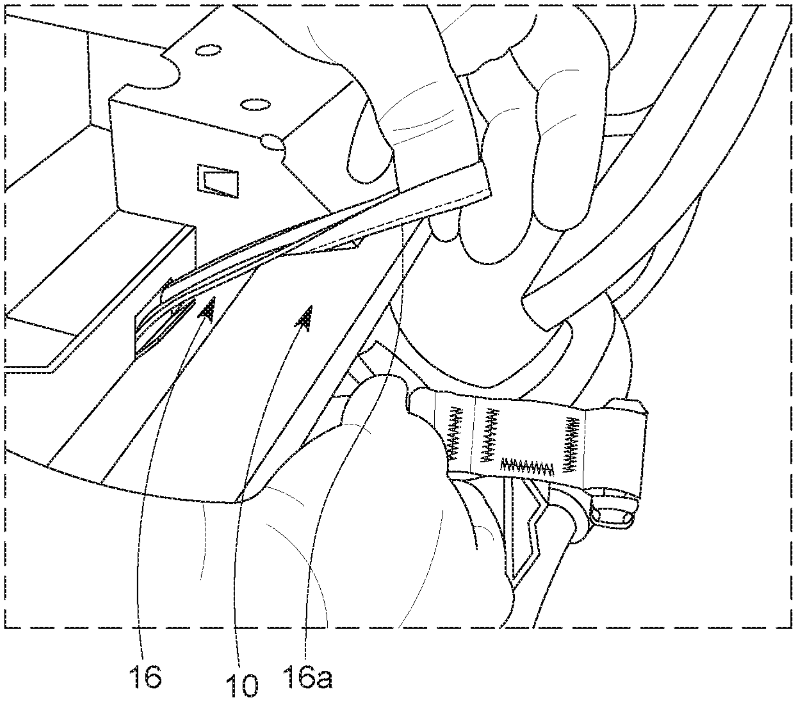
FIG. 5 illustrates the first strap section looped around a component of the patient support apparatus.
Figure 6:
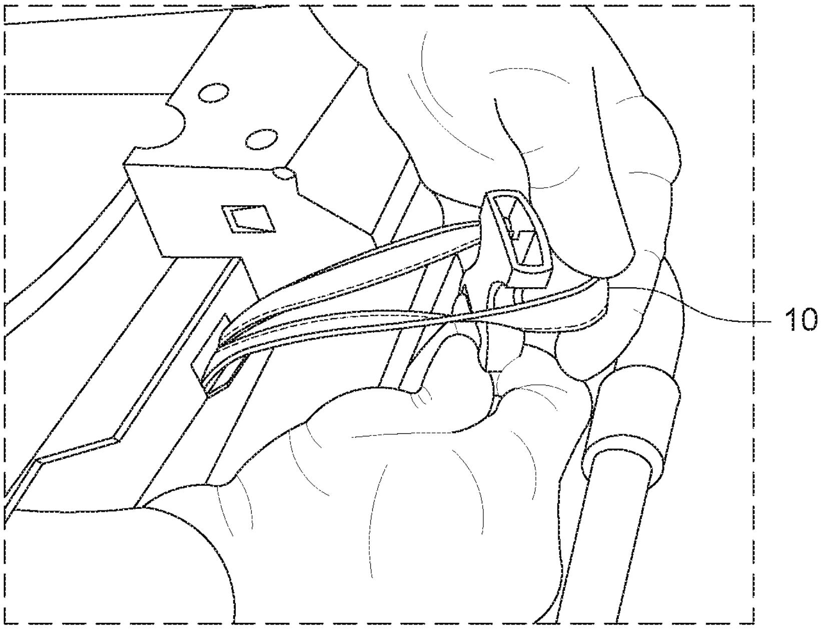
FIG. 6 is a similar view to FIG. 5 but with the second strap section being looped through the loop formed by the first strap section.

Referring again to FIGS. 1-3, first strap section 16 has opposed first and second distal ends **16*b*, 16*c* and forms loop 16*a* between first and second distal ends 16*b*, 16*c*. Loop 16*a* is sized for looping around the component of the patient support apparatus and, further, for receiving at least a portion of second strap section 18 and buckle component 14 through the portion of the loop that extends beyond the component, such as shown in FIGS. 5 and 6, for buckling to a buckle body or buckle tab on a restraint strap, such as shown in FIG. 8**.

The second strap section 18 has first and second ends **18*a* and 18*b*, with the first end 18*a* coupled to first and second distal ends 16*b*, 16*c* of first strap section 16, for example, via stitching 18*c* (FIG. 2). Second end 18*b* of second strap section 18 is coupled to buckle component 14. For example, second end 18*b* may form a loop 18*d* in second strap section 18 (which is secured back on itself by stitching 18*e*) and which can extend through buckle component 14 to secure buckle component 14 to the second strap section 18**.

To secure restraint anchor 10 to the component of the patient support apparatus, strap 12 has at least one stop 20 to limit backwards movement of the second strap section 18 through the loop 16*a* so that stop 20 helps retain the restraint anchor 10 on the component of the patient support apparatus. In the illustrated embodiment, stop 20 comprises a loop 22. Loop 22 may be formed at or from first end 18*a* of second strap section 18. Further, when formed from the first end 18*a* of second strap section 18, loop 22 may be secured by the same stitching 18*c* that secures distal ends 16*b*, 16*c* of first strap section 16 to second strap section 18 (see FIG. 2).

Figure 7:
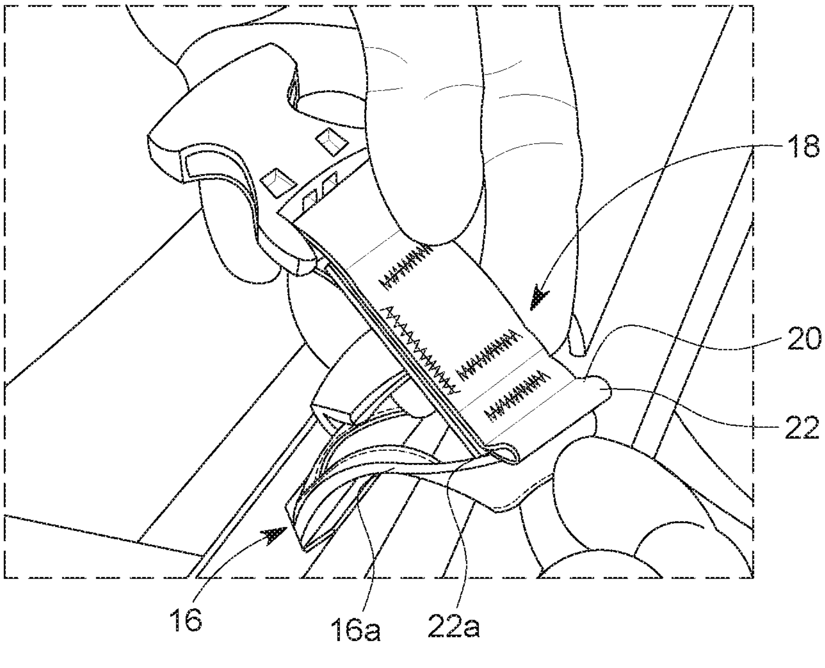
FIG. 7 illustrates the second strap section being pulled through the loop formed by the first strap section wherein the stops are also pulled through the loop to be captured by the first strap section and thereby secure the restraint anchor to the patent support apparatus.

Loop 22 is secured in a folded configuration so that it forms a V-shaped recess 22*a* (FIG. 7) between loop 22 and strap 12, which faces the direction of withdrawal of second strap section 18 from loop 16*a* (versus extension of second strap section 18 through loop 16*a*). Recess 22*a* is sized to receive loop 16*a* of first strap section 16. In this manner, when second strap section 18 is extended through loop 16*a*, loop 16*a* can be captured in the recess 22*a* formed by loop 22 so that loop 22 thereby forms a stop that prevents second strap section 18 from being withdrawn back through loop 16*a*. Loop 22, hence, retains restraint anchor 10 on the component until a force is applied to dislodge loop 16*a* from loop 22.

Optionally, a second stop 24 (FIG. 3) may be provided on an opposed side of strap 12 so that the restrain anchor can be installed with an inverted configuration. Stop 24 may be similarly formed from a loop 26 that is also formed from the second strap section 18 and folded so that it forms a V-shaped recess between loop 26 and strap 12, which also faces the direction of withdrawal of second strap section 18 from loop 16*a*.

In addition, strap 12 may include a series of loops on each side of the strap 12 so that the restraint anchor can be used on different sized components.

As best seen in FIGS. 4-7, strap 12 is looped around a patient support apparatus component, such as a frame rail, and fed back through itself so that the loop 16*a* is then wedged between one of the loops 22, 26. The other loop 26, 22 can act as a secondary support by bearing against the component of the patient support apparatus and may also help prevent the strap 12 from loosening from either side or falling off the component. This secondary support may also be accomplished by magnets, velcro hook and loop fasteners, welded or attached by steel or metal quick release buckle. Restraint anchor 10 may also be configured to be permanently affixed to the patient support apparatus.

Either way, once restraint anchor is attached to patent support apparatus, it is, therefore, designed to accept soft limb restraint straps or tethers for control of uncooperative patients.

I claim:

1. A restraint anchor for a component of a patient support apparatus, said restraint anchor comprising:

a strap having a first strap section and a second strap section;

a buckle component;

said first strap section having opposed first and second distal ends and forming a first loop between said first and second distal ends, said first strap section for looping around the component of the patient support apparatus and for receiving said second strap section through said first loop for securing said restraint anchor to the component;

said second strap section having first and second ends, said first end of said second strap section coupled to said first and second distal ends of said first strap section, said second end of said second strap section coupled to said buckle component; and said strap having a stop with a v-shaped recess to limit movement of said second strap section through said first loop wherein said stop helps retain said restraint on the component, wherein said stop comprises a second loop having a base and a looped end, and said base being secured to or formed with said strap, and said second loop having a distal end distal from said base and being cantilevered from said strap and with said looped end and said base forming said v-shaped recess between said looped end and said strap wherein when said buckle component is pulled through said first loop said second loop will retain its looped shape and the v-shaped recess and retain said restraint on the component.

2. The restraint anchor according to claim 1, further comprising a pair of said stops.

3. The restraint anchor according to claim 2, wherein each stop of said pair of stops is secured to opposed sides of said strap.

4. The restraint anchor according to claim 1, wherein said second strap section is stitched to said first and second distal ends of said first strap section.

5. The restraint anchor according to claim 1, wherein said second strap section is looped to form said second loop.

6. The restraint anchor according to claim 5, wherein said first end of said second strap section is looped to form said second loop.

7. The restraint anchor according to claim 6, wherein said first end of said second strap section is coupled to said first and second distal ends of said first strap section by stitching, and said base of said second loop is secured to said strap by said stitching.

8. The restraint anchor according to claim 7, wherein said second end of said second strap section forms a third loop looped through said buckle component to couple said buckle component to said strap via said second end of said second strap section.

9. A restraint anchor for a component of a patient support apparatus, said restraint anchor comprising:

a strap having a first strap section and a second strap section;

a buckle component;

said first strap section having opposed first and second distal ends and forming a loop between said first and second distal ends, said first strap section for looping around the component of the patient support apparatus and for receiving said second strap section through said loop for securing said restraint anchor to the component;

said second strap section having first and second ends, said first end of said second strap section coupled to said first and second distal ends of said first strap section, said second end of said second strap section coupled to said buckle component; and said strap having a stop with a v-shaped recess to limit movement of said second strap section through said loop wherein said stop helps retain said restraint on the component, wherein said first strap section comprises a section of strap that is folded over along its longitudinal length so that its width is reduced to facilitate insertion.

10. The restraint anchor according to claim 5, wherein said stop comprises a second loop having a base and a looped end and forming said v-shaped recess therebetween, and said base being secured to or formed by said strap.

11. The restraint anchor according to claim 9, further comprising a pair of said stops.

12. The restraint anchor according to claim 11, wherein said pair of stops are each secured to or formed at opposed sides of said strap.

13. The restraint anchor according to claim 9, wherein said second strap section is stitched to said first and second distal ends of said first strap section.

14. The restraint anchor according to claim 9, wherein said second strap section forms said stop.

15. The restraint anchor according to claim 10, wherein said first end of said second strap section is looped to form said second loop, and said second loop forming said stop.

16. The restraint anchor according to claim 15, wherein said first end of said second strap section is coupled to said first and second distal ends of said first strap section by stitching, and said base of said second loop is secured to said strap by said stitching.

17. The restraint anchor according to claim 15, wherein said second end of said second strap section forms a third loop looped through said buckle component to couple said buckle component to said strap via said second end of said second strap section.

18. A restraint anchor for a component of a patient support apparatus, said restraint anchor comprising:

a strap having a first strap section and a second strap section;

a buckle component;

said first strap section having opposed first and second distal ends and forming a loop between said first and second distal ends, said first strap section for looping around the component of the patient support apparatus and for receiving said second strap section through said loop for securing said restraint anchor to the component;

said second strap section having first and second ends, said first end of said second strap section coupled to said first and second distal ends of said first strap section, said second end of said second strap section coupled to said buckle component; and said strap having a stop to limit movement of said second strap section through said loop wherein said stop helps retain said restraint on the component, and wherein said first strap section comprises a section of strap that is folded over along its longitudinal length so that its width is reduced to facilitate insertion.

19. The restraint anchor according to claim 18, wherein said first end of said second strap section is looped to form a second loop, and said second loop forming said stop.

* * * * *